3,091,600
LINEAR AROMATIC ACID COPOLYESTERS MODIFIED WITH DIMER GLYCOLS HAVING 36 CARBONS
John R. Caldwell and Russell Gilkey, Kingsport, Tenn., assignors to Eastman Kodak Company, Rochester, N.Y., a corporation of New Jersey
No Drawing. Filed Jan. 5, 1961, Ser. No. 80,733
18 Claims. (Cl. 260—75)

This invention relates to high-melting copolyesters which are suitable for use in preparing films and readily dyeable fibers, and is particularly concerned with the preparation of new and improved copolyesters of a glycol of 2–12 carbon atoms, an aromatic dicarboxylic acid such as terephthalic, 4,4'-sulfonyldibenzoic, 4,4'-ethylenedibenzoic, 4,4'-ethylenedioxydibenzoic, 4,4'-diphenic and trans-cyclohexane-1,4-dicarboxylic, and a second glycol obtained by reduction of a dicarboxylic acid derived from the polymerization of unsaturated fatty acids.

A large number of synthetic linear condensation polymers are known to the art and such polymers are ordinarily prepared by reacting a polybasic organic acid with a polyhydric alcohol, with or without the use of condensation catalysts. The high-molecular weight products which are thereby obtained are capable of being drawn into oriented fibers of the type described in U.S. Patent 2,071,250. The usual polyester fibers, such as those prepared from polyethylene terephthalate, are very difficult to dye, and special methods are usually employed in order to achieve any satisfactory degree of dyeing. Thus, such polyesters must be dyed at super-atmospheric pressures with cellulose acetate dyes in order to obtain practical shades. This method is both expensive and time consuming. An alternative process which has been used with such difficulty dyeable polyesters involves the use of a swelling agent or a dye assistant such as phenol, cresol, benzoic esters, dischlorobenzene, or similar material. This process, however, suffers the disadvantage of often causing nonuniform swelling of the fiber with a resultant nonuniform application of the dye. Furthermore, most of the dyeing assistants are objectionable to use because of expense, toxicity, objectionable odor, and similar disadvantages.

It is of course well known that polyesters prepared from glycols and various aromatic dicarboxylic acids such, for example, as polyethylene terephthalate can be employed to produce textile fibers or film, sheeting and similar products because of their high melting points, crystallinity and other desirable physical and mechanical properties. However, these fibers suffer certain deficiencies, not only from the standpoint of dyeing, as pointed out above, but also for various applications are insufficiently lacking in elongation and good elastic recovery. Recognizing these shortcomings of the known fiber-forming polyesters, attempts have been made to modify the fiber-forming materials in various ways. For example, it has been proposed to form copolyesters from aromatic dibasic acids and glycols wherein at least one of the glycols is a poly(alkylene oxide) glycol such as poly(ethylene oxide) glycol to enhance the dyeability of fibers produced from such copolyesters and to give the material increased water absorptive capacity. Such copolyesters are described in British Patent 779,054. However, as pointed out by D. Coleman in J. Pol. Sci. 14, 25 (1954), these practical advantages are offset by reduced stability to the action of ultraviolet light, leading to fading of dyeings and a decrease in molecular weight.

It is also known from the disclosure of Johnston, U.S. Patent 2,347,562, to form copolyesters from the so-called "dimer glycols" and polycarboxylic acids for the production of alkyd type resins which are useful as plasticizers or modifiers in coating compositions. It is also known from the disclosure of Sparks and Young, U.S. Patent 2,424,588, to produce viscosity improvers for lubricating oils by condensing dimer glycols with a polybasic organic acid. For these uses intended in these disclosures, it is obvious that the copolyesters thus obtained are neither high melting nor crystalline and thus incapable of forming fibers, films, and the like.

It is an object of this invention to provide new and improved linear copolyesters which have the desirable high melting points and other mechanical and physical properties characteristic of polyesters of glycols and aromatic dicarboxylic acids but which, in addition, possess a greatly improved dye affinity, especially for cellulose acetate dyes.

Another object is to provide new and improved crystalline linear copolyesters of high melting points from aromatic dicarboxylic acids and a mixture of glycols and susceptible of use in the manufacture of textile fibers, films and sheets and in the manufacture of plastic molded articles.

Another object is to provide new and improved crystalline linear copolyesters fibers of high melting points from aromatic dicarboxylic acids and a mixture of glycols which have exceptional dye affinity, high elongation and excellent elastic recovery.

Another object is to provide a new moldable polyester plastic composition capable of producing tough flexible molded products of high impact strength and other desirable properties.

Other objects will appear hereinafter.

These objects are accomplished by the following invention which, according to one embodiment thereof, comprises forming a copolyester by coreacting to an inherent viscosity of at least 0.4 at least two different glycols, one of which may contain two to twelve carbon atoms (which may contain cyclic structures in the molecule) and the other of which is a dimer glycol prepared by dimerizing unsaturated higher fatty acids and reducing the resulting acid or its ester to the corresponding glycol, with an aromatic dicarboxylic acid such as terephthalic, 4,4'-sulfonyldibenzoic, 4,4'-ethylenedibenzoic, 4,4'-ethylenedioxydibenzoic, 4,4'-diphenic, and trans-cyclohexane-1,4-dicarboxylic acids. Specifically the copolyester may, in accordance with the invention, contain from 98–65 mole percent of the first classification of glycol and from 2–35 mole percent of the dimer glycol. This will correspond to 5–50 weight percent of the dimer glycol which, as will be discussed hereinafter has a very important effect on the ultimate physical and other properties of the copolyesters of the invention. The resulting copolyesters quite unexpectedly have melting points above 200° C. even when as much as 50 weight percent of the dimer glycol is employed. These copolyesters have greatly improved dyeing properties, elongation, and elastic recovery without sacrificing the desirable high melting point which characterizes unmodified glycol aromatic dicarboxylic acid polyesters. Thus the copolyesters embodying the invention are of particular utility in the manufacture of high strength, readily dyeable synthetic fibers and in the manufacture of film, sheeting, and molded objects.

The copolyesters of the invention are readily prepared by any of the well-known processes employed for preparing unmodified polyesters from a glycol and a polybasic acid. Thus, the copolyesters of the invention may be prepared by heating a mixture of the glycols and the acidic component, preferably in ester form, in the presence of a polymerization catalyst. The glycols which are employed in accordance with the invention, namely, a glycol of two to twelve carbon atoms and a dimer glycol, may be employed in an amount which is at least equivalent to the amount of aromatic dicarboxylic acid and preferably in excess on a molar equivalent basis. The first mentioned glycol is the one which is employed to provide this excess and the excess is removed under the conditions of the reaction by virtue of the fact that it distills at a temperature at which the dimer glycol is completely unaffected, thus producing a copolyester having the desired amount of the first glycol ester and of the dimer glycol ester. Thus for example, 25–100 mole percent excess of the more volatile glycol is desirably employed in order to facilitate the reaction. The copolyester formation is also facilitated by the use of a condensation catalyst and preferably an organometallic catalyst, a large number of which are described in John R. Caldwell's U.S. Patent Nos. 2,744,089–2,744,098, inclusive, 2,720,502, 2,720,506, 2,720,507 and 2,744,129. The catalysts which are preferred for use in practicing the invention are the titanium compounds specifically disclosed in U.S. Patent 2,720,502, tin compounds as disclosed in U.S. Patent 2,720,507, and aluminum compounds as disclosed in U.S. Patent 2,720,506. In accordance with this practice, especially when such catalysts are employed, the esterified acids and/or esterified glycols can be readily used instead of the free acids and free glycols.

The catalyst is desirably employed in an amount of from 0.005% to 0.01%, but preferably from 0.006% to 0.008% based on the weight of the reactants. The copolyester formation is effectively between the glycol of two to twelve carbon atoms, as above specified, the dimer glycol and the aromatic dicarboxylic acid, whether such glycols and acids are introduced in free or esterified form. Consequently, it will be understood that the term "glycol" and the term "acid" as employed herein and in the appended claims describe the actual reactants in situ, such reactants in situ being the same with the introduction initially of the alkyl esters of the glycols and acids as well as the unesterified compounds. The alkyl esters which are preferably employed are those wherein the alkyl groups contain 1–6 carbon atoms. When the polyester formation is effected, the initial reaction involves ester interchange between the glycol and the aromatic dicarboxylic acid with the splitting out of the alkyl alcohol, and hence the presence of the alkyl groups does not affect the course of the reaction or the identity of the copolyesters obtained therefrom.

The formation of the new and improved copolyesters is, as indicated above, obtained by the employment of two different glycols, in accordance with the invention one of which is a dimer glycol. The dimer glycol is prepared by dimerizing unsaturated fatty acids such as linoleic and linolenic acids, and reducing the resulting acid or its ester to the corresponding glycol. The preparation and structure of the dimerized fatty acid and the glycol derived from it is described in J. Am. Chem. Soc., 66, 84 (1944), and in U.S. Patent to Johnston, 2,347,562. Several different grades of dimerized fatty acids are available from commercial sources and these acids vary in iodine value and in monomer and trimer content. The best results in obtaining copolyesters in accordance with our invention are usually obtained by employing a dimer acid fraction that has been substantially freed of monomer and trimer fractions by molecular distillation. The dimer glycol which is preferred for use in the invention is one containing approximately 36 carbon atoms and is obtained by reduction of an ester of the dimer acid fraction with copper chromite catalyst, such reduction resulting in conversion of ester to glycol and saturation of all double bonds which may have been present in the dimer ester. As set forth in the Johnston patent, the dimer glycols may be prepared from polyene fatty acids and their monohydric alcohol esters by polymerizing these compounds at elevated temperature and hydrogenating the polymer at a temperature at least about 200° C. to the corresponding alcohol in the presence of a hydrogenolysis catalyst selected from the group consisting of copper chromite and zinc chromite.

The glycols which can be used in conjunction with the dimer glycols are those commonly used in the preparation of high-melting, crystalline polyesters. Representative examples are: ethylene glycol, trimethylene glycol, 2,2 - dimethyl - 1,3 - propanediol, tetramethylene glycol, pentamethylene glycol, 1,4-cyclohexanedimethanol, 1,3-cyclohexanedimethanol, p-xylylene glycol and 2,2,4,4-tetramethyl-1,3-cyclobutanediol.

Aromatic dicarboxylic acids or mixtures of dicarboxylic acids which may be employed in the formation of the high-melting, crystalline polyesters of the invention include: terephthalic, 4,4'-sulfonyldibenzoic, 4,4'-ethylenedibenzoic, 4,4'-ethylenedioxydibenzoic, 4,4'-diphenic, and trans - cyclohexane - 1,4 - dicarboxylic acids. A minor amount as for example, not over 20 mole percent, of the acid component may be an aliphatic dicarboxylic acid and serves further to modify the polyester. The aromatic dicarboxylic acid can be employed in either free or esterified form with the alkyl esters containing 1–6 carbon atoms in the alkyl group being preferred. In the condensation reaction, the aromatic dicarboxylic acid first condenses with an equivalent amount of glycol, and hence the glycol and aromatic dicarboxylic acid are employed in amounts wherein the glycol is at least equivalent to the aromatic dicarboxylic acid. When the glycol is present in an excess, the reaction still proceeds on a molar equivalent basis between the glycol and the aromatic dicarboxylic acid with the excess glycol distilling out of the reaction mixture during the course of the reaction.

In forming the copolyesters of this invention, it is usually desirable to carry out the reaction in at least two stages. The first stage of the reaction is carried out by heating a mixture of the glycol, the dimer glycol and the aromatic dicarboxylic acid in the presence of a condensation catalyst at a temperature of 180–260° C. and atmospheric pressure, whereby low molecular weight glycol esters are formed, and the alcohol liberated by ester interchange is distilled out. During this initial stage, as well as during the subsequent polymerization, oxygen and moisture are excluded from the reaction mixture. The second stage of the reaction can be carried out either by melt polymerization or by a solid phase process. In the former method, the temperature of the reaction mixture is raised to 250–300° C. in order to mtaintain the copolyester in molten form. Some of the excess glycol is distilled off at this time. The reaction mixture is then subjected to vacuum, and the heating above the melting point is continued with agitation of the mixture in order to facilitate the escape of volatile products from the highly viscous melt. The heating is carried out until the resulting polymer forms a fiber when a rod is touched to the surface of the melt and quickly pulled away. Ordinarily, the polymerization is carried out until the polymer thus formed has an inherent viscosity of at least 0.4 and desirably at least 0.6.

In an alternative process, the second stage of the reaction can be carried out by the solid phase process. When this method is used, a prepolymer having an inherent viscosity of 0.15 to 0.30 is prepared by stirring the reaction mixture under vacuum as described hereinabove. This prepolymer is then removed from the reaction vessel and pulverized to a particle size of about 0.01–0.03 inch. The pulverized prepolymer is then heated in vacuum at a temperature below its melting point or in an inert gas stream at such temperature. The temperature employed is usually in the range of 200–260° C. depending upon the melting point of the copolyester. As before, the polymerization is carried on until the resulting copolyester has an inherent viscosity of at least 0.4 and desirably at least 0.6.

Reference has been made to the fact that the copolyesters of this invention are high-melting, crystalline copolyesters having an inherent viscosity of at least 0.4. The melting point of the esters is above 200° C. and may be from 200 to 350° C. The inherent viscosity may be defined as $$\frac{\log_e Nr}{C}$$

in which $Nr$ is the viscosity of a dilute solution of the polymer in 60 parts by weight of phenol and 40 parts by weight of tetrachlorethane divided by the viscosity of the mixed solvent in the same units and at the same temperature, and C is the concentration in grams of polymer per 100 cc. of solution.

The resulting copolyesters prepared in accordance with this invention are highly valuable for the manufacture of fibers, films, and molded objects. Fibers are readily prepared from the polymers by usual melt spinning or solvent spinning processes, and the fibers thereby obtained possess a highly advantageous combination of characteristics of having a melting point well above 200° C., a sticking temperature of at least about 200° C., excellent dyeability, high tensile strength, and good elongation and elastic recovery.

Reference has been made to the fact that the dimer glycol constitutes from 5–50 weight percent (or 2–35 mole percent of the glycol content) of the copolyester of the invention. Any range of properties from soft, flexible materials to hard, tough compositions can be made by varying the amount of dimer glycol and the composition of the parent polyester. As exemplifying the type of products, among many others, which may be prepared from these copolyesters two general classes of products may be considered: namely, (a) copolyesters containing from 5–15 weight percent (2–6 mole percent of the glycol content) of the dimer glycol in the copolyester and (b) copolyesters containing 15–50 weight percent (6–35 mole percent of the glycol content) of the dimer glycol and especially products containing 30–50 weight percent of the dimer glycol.

Products of class (a) are especially valuable in the production of textile fibers because of the fact that the amount of dimer glycol present in the copolyester brings about relatively little change in the physical properties, such as hardness and flexibility (texture) of the polymer. The presence of the indicated amount of the dimer glycol causes practically no depression of the melting point of the copolyester, a phenomena which is quite unexpected and especially valuable in the production of fibers. Similarly no substantial change occurs in the modulus of elasticity of the material. In addition, the presence of the dimer glycol in the copolyester imparts highly desirable dyeability to fibers formed therefrom and renders the material susceptible of dyeing without the use of swelling agents.

Products of class (b) produced from copolyesters containing from about 20 weight percent to 50 weight percent, and preferably from 30–50 weight percent of the dimer glycol, are leathery or rubbery in nature. These products are valuable for the production of high-impact molding plastics and flexible, elastic films or coatings. These compositions are of particular value for the production of high-elongation (50–100%) fibers having excellent elastic recovery. Such fibers also possess other desirable mechanical and physical properties such as high melting point and flexibility as well as enhanced dyeability with a wide range of dyes.

The condensation of a difunctional acid with a mixture of glycols results in a randomly distributed copolymer. In other words, in such a case the ester repeat units of the different glycols are randomly distributed in the polymer chain. Thus, the result of employing more than one glycol is ordinarily to give a polymer of lower melting point and decreased crystallinity as compared to the case in which the polymer results from the employment of a single glycol. In employing two different glycols, for example, since the polymer melting point is determined by the molar fraction of the modifying component, that is, the second glycol, the higher the molecular weight of the modifier the less effect it will have in lowering the melting point. In accordance with the present invention, we employ a dimer glycol having a molecular weight of greater than 500, whereas ethylene glycol, a typical example of the 2–12 carbon atom glycols employed to form the copolyester, has a molecular weight less than 100. As a result the addition of a certain weight percent (5–50 weight percent) of the dimer glycol has been found to have much less effect on the melting point of the resulting copolyester than would the same weight percent of a low molecular weight glycol such as the 2–12 carbon atom glycols, since the mole percent of the dimer glycol would be much smaller than would be required in the case of a second low molecular weight glycol.

In addition to the above considerations, it has been found that other characteristics of the copolyester such as dyeability and elongation depend on the weight percent of the modifier (dimer glycol) in the copolyester. In other words, in accordance with the invention a weight percent of dimer glycol can be incorporated in a copolyester in such a small amount as not adversely to affect the crystallinity and melting point of the copolyester and still impart good dyeability and elastic properties thereto. We have also found that the dimer glycol has the advantageous property of being bulky enough to form islands of amorphous sections in the crystalline copolyester. These sections form the dyeable sites. In addition, the aliphatic hydrocarbon sections of the dimer glycol give the copolyester a flexibility which imparts unexpected and unusually good elastic properties to fibers and other products produced therefrom.

In the following examples and descriptions we have set forth several of the preferred embodiments of our invention, but they are included merely for purposes of illustration and not as a limitation thereof.

*Example 1*

A mixture of 97 g. of dimethyl terephthalate, 24 g. of dimer glycol (obtained by copper chromite reduction of a commercially available esterified dimer acid of the type described in J. Am. Chem. Soc., 66, 84 (1944), according to the method therein described), and 86 g. of 1,4-cyclohexanedimethanol was placed in a reaction vessel equipped with a stirrer, a short distillation column, and an inlet for dry, purified nitrogen. A solution of 0.05 g. of titanium tetraisopropoxide in ethyl alcohol was added as catalyst, and the mixture was stirred at 210–220° C. in a stream of nitrogen. As the methyl alcohol, formed by transesterification, was distilled from the reaction mixture, the temperature was raised to keep the low-molecular-weight glycol esters melted. The reaction mixture was finally held at 290° C. for about 5 minutes before applying vacuum. After 5–6 minutes under vacuum, the copolyester prepolymer was poured into water for subsequent solid-phase build up. In the preceding step of the operation, the vacuum was bled to nitrogen to prevent contact of the hot melt with oxygen. The prepolymer was dried and ground to a particle size of 0.01 inch. The final stage of the polymerization was carried out by heating the powdered prepolymer with stirring at 255° C. under a vacuum of 0.2 mm. for 4 hours. The copolyester thus formed had an inherent viscosity, as measured in a solvent mixture of 60 parts phenol and 40 parts tetrachlorcethane, of 0.97. The melting point, as determined under crossed nicols on the hot stage of a microscope, was 285–298° C. This copolyester contains 15% by weight of dimer glycol.

A polymer of this composition was melt spun into fibers having a tenacity of 3 g. per denier and an elongation of 30%. The fibers had excellent elastic recovery. A sock was knitted from the yarn. It had a fabric stiffening temperature of 220° C., which is 20–30° higher than the corresponding copolyester composition containing 15% by weight of a low-molecular-weight glycol or aliphatic acid. The sock dyed to deep shades with disperse dyes and the dyed fabric exhibited good wash and light fastness. This composition is also valuable in the manufacture of film and molded articles.

*Example 2*

A copolyester composition was made by a procedure similar to that used in Example 1 but containing 30% by weight dimer glycol instead of 15%. The copolyester had a melting point range of 265–278° C. This product could be melt spun to form an elastic-type yarn with a sticking temperature of about 190° C. The fibers had high elongation and good elastic recovery.

*Example 3*

A copolyester composition was made according to the procedure outlined in Example 1 but containing 30% by weight of the dimer glycol. This copolyester had a melting point range of 265–278° C. This copolyester composition was injection molded to give tough, flexible molded specimens having the following properties:

| | |
|---|---|
| Durometer hardness | 71 |
| Button impact strength | 43 |
| Tensile strength (p.s.i.) | 4860 |
| Elongation (percent) | 120 |
| Tensile modulus | $.86 \times 10^5$ |

A test specimen under a load of 55 p.s.i. can be heated to 179° C. before it undergoes 2% distortion.

The button impact strength test is run as follows: standard buttons ⅛″ thick and 1⅛″ in diameter are tested in the Tinius-Olsen Izod impact tester. A jig clamps the button vertically with the plane of the button normal to the striking head. Approximately ¼ of the button is exposed to the striker. The striking head has a ⅛″ ball bearing mounted at the center of percussion. Four tests are made on each button at approximately 90° apart. The impact is recorded in units of the scale (0–50) normally used for Izod impact results. The figure quoted is an average of the four tests.

The unmodified homopolymer made from terephthalic acid and 1,4-cyclohexanedimethanol has no value as a molding plastic. Articles molded from the polyester are so crystalline that they are extremely brittle and have a very low impact strength (less than 2). The presence of the dimer glycol in accordance with the invention restricts the crystallinity and greatly increases the toughness of the molded object.

*Example 4*

A copolyester composition made according to the procedure outlined in Example 1 but containing 20% by weight of the dimer glycol had a melting range of 274–28° C. This copolyester composition was injection molded to give tough, flexible molded specimens having the following properties:

| | |
|---|---|
| Durometer hardness | 75 |
| Button impact strength | 24 |
| Tensile strength (p.s.i.) | 5810 |
| Elongation (percent) | 30 |
| Tensile modulus (p.s.i.) | $1.53 \times 10^5$ |

A test speciment under a load of 55 p.s.i. can be heated to 201° C. before it undergoes 2% distortion.

*Example 5*

Polyethylene terephthalate was modified with dimer glycol so that the copolymer contained 10% by weight of the modifier. This copolyester was prepared by a solid-phase technique similar to that used in Example 1. The product had a melting point range of 225–261° C. and an inherent viscosity of 0.78. Fibers spun from the polymer had properties very similar to those of the unmodified polyethylene terephthalate. However, they had the advantage that they could be dyed to deep shades with disperse dyes using ordinary dyeing techniques.

*Example 6*

Polyethylene terephthalate was modified with dimer glycol so that the copolymer contained 25% by weight of the modifier. This copolyester was prepared by melt polymerization at 250° C. The melt was stirred under a vacuum of 0.3 mm. for 3 hours. The inherent viscosity of the resulting polymer was 0.71, and it melted over a range of 230–240° C. This copolyester composition was injection molded to give tough, flexible molded specimens having the following properties:

| | |
|---|---|
| Durometer hardness | 69 |
| Buttom impact strength | 38 |
| Tensile strength (p.s.i.) | 4850 |
| Elongation (percent) | 472 |
| Tensile modulus (p.s.i.) | $0.9 \times 10^5$ |

This polyester could also be melt spun to give elastic-type yarn.

Polyethylene terephthalate has no value as a molding plastic because of its high degree of crystallinity. It is therefore surprising to find that the presence of only 25% dimer glycol entirely eliminates the brittleness and gives a product having a high impact strength. The unmodified polyester has an impact strength of about 3 units.

*Example 7*

A copolyester was prepared from 4,4′-ethylenedioxy dibenzoic acid, ethylene glycol, and dimer glycol (prepared as in Example 1). The dimer glycol amounted to 20% by weight of the polymer. This composition had a melting range of 220–232° C. and was suitable for the manufacture of fibers, films, and molded objects with high elongation and softening temperature.

*Example 8*

Incorporating 30% by weight of dimer glycol into a polyester of 4,4′-diphenic acid and tetramethylene glycol gave a copolymer which is valuable in the production of elastic fibers and high-impact plastics. The fibers can easily be dyed to deep shades with disperse dyes.

*Example 9*

A copolymer of 4,4′-sulfonyldibenzoic acid, tetramethylene glycol, and dimer glycol was prepared. The dimer glycol portion amounted to 50% by weight of the copolyester. This composition was characterized by its very high elongation and high-softening temperature. It melted in the range 265–280° C. It is useful in the manufacture of rubbery materials, whether fiber, film, or plastic.

*Example 10*

A copolymer of terephthalic acid, 2,2,4,4-tetramethyl-1,3-cyclobutanediol, and dimer glycol was prepared. The dimer glycol portion amounted to 20% by weight of the copolyester. This composition had a melting range of 240–253° C. and was suitable for the manufacture of fibers, films and molded objects with high elongation and softening temperature.

*Example 11*

A copolymer of trans-cyclohexane-1,4-dicarboxylic acid, trans-1,4-cyclohexanedimethanol and dimer glycol was prepared by the procedure described in Example 1. The dimer glycol portion amount to 15% by weight of the copolyester. This composition had a melting range of 226–233° C. and was especially suitable for the production of films and molded objects with excellent hydrolytic stability and toughness.

*Example 12*

A polyester was prepared from a mixture of 85 mole percent of 4,4'-sulfonyldibenzoic acid and 15 mole percent of sebacic acid combined with tetramethylene glycol and dimer glycol with 20% by weight of dimer glycol in the composition. This product had an inherent viscosity of 0.88 and a melting range of 283–295° C. This composition is useful in the manufacture of elastic, dyeable fibers and tough, elastic films.

As indicated above, the copolyesters of our invention which give the best results for the production of spinnable fibers are those in which the glycol portion of the copolyester contains 2–6 mole percent of the dimer glycol, while for moldable compositions suitable for producing tough, flexible products of high impact strength the preferred compound contains in the glycol portion 6–35 mole percent of the dimer glycol.

It will be apparent that, in accordance with our invention, not only can textile fibers of exceptionally high elongation and elastic recovery, high tensile strength and excellent dyeability be produced, but also for the first time in the art, so far as is known, a polyester molding composition capable of producing tough, flexible molded products of high impact strength may be obtained. The production of good quality molding products is an especially valuable advance in the art since it is well known that high-melting, crystalline polyesters, in general, are of no value as molding plastics. When such polymers are molded by standard methods, the molded objects develop a high degree of crystallinity during the process. This state of excessive crystallinity causes brittleness and as a result the molded object has a low impact strength. In contrast to this, and quite unexepectedly, the modified polyesters of the present invention do not develop an excessive degree of crystallinity under molding conditions, it having been found that the presence of the dimer glycol so alters the crystal structure that amorphous areas are present. These amorphous areas impart toughness to the structure. It is also important to note that quite unexpectedly the composition retains, to a large extent, its original high melting point.

Although the invention has been described in considerable detail with particular reference to certain preferred embodiments thereof, variations and modifications can be effected within the spirit and scope of the invention as described hereinabove, and as defined in the appended claims.

We claim:

1. A linear highly polymeric spinnable and moldable copolyester having a melting point of at least 200° C. and an inherent viscosity of at least 0.4, said copolyester being essentially composed of constituents (A) and (B) as follows: (A) not over 20 mole percent of an aliphatic dicarboxylic acid containing 4 to 20 carbon atoms and at least 80 mole percent of an acidic material consisting of aromatic dicarboxylic acid selected from the group consisting of terephthalic, 4,4'-ethylene-dioxydibenzoic, 4,4'-diphenic and trans-cyclohexane-1,4-dicarboxylic acids, and (B) a glycol essentially composed of 98–65 mole percent of a glycol of 2–12 carbon atoms and 2–35 mole percent of a dimer glycol, said dimer glycol containing 36 carbon atoms and being the reduced dimer of an unsaturated fatty acid selected from the group consisting of linoleic acid and linolenic acid.

2. The copolyester of claim 1 in which the glycol of 2–12 carbon atoms is a polymethylene glycol of 2–10 carbon atoms.

3. The copolyester of claim 1 in which the glycol containing 2–12 carbon atoms contains a cyclic structure selected from the group of cyclohexane and cyclobutane rings.

4. The copolyester of claim 1 in which the acidic material is terephthalic acid, the glycol is a polymethylene glycol of 2–10 carbon atoms.

5. The copolyester of claim 1 in which the acidic material is terephthalic acid and the glycol containing 2–12 carbon atoms contains a cyclic structure selected from the group of cyclohexane and cyclobutane rings.

6. The copolyester of claim 1 in which the acidic material is terephthalic acid, the glycol containing 2–12 carbon atoms is ethylene glycol.

7. The copolyester of claim 1 in which the acidic material is terephthalic acid, and the glycol containing 2–12 carbon atoms is 1,4-cyclohexanedimethanol.

8. The copolyester of claim 1 in which the acidic material is terephthalic acid and the glycol containing 2–12 carbon atoms is 2,2,4,4-tetramethylcyclobutane-1,3 diol.

9. Synthetic fiber composed of the copolyester of claim 1.

10. Synthetic fiber composed of the copolyester of claim 1 in which the acidic material is terephthalic acid and the glycol containing 2–12 carbon atoms is ethylene glycol.

11. Synthetic fiber composed of the copolyester of claim 1 in which the acidic material is terephthalic acid and the glycol containing 2–12 carbon atoms is 1,4-cyclohexanedimethanol.

12. Synthetic fiber composed of the copolyester of claim 1 in which the acidic material is terephthalic acid and the glycol of 2–12 carbon atoms is 2,2,4,4-tetramethylcyclobutane-1,3 diol.

13. Synthetic fiber composed of the copolyester of claim 1 in which the acidic material is terephthalic acid, the glycol containing 2–12 carbon atoms is ethylene glycol and the dimer glycol is present in an amount corresponding to 2–6 mole percent.

14. Synthetic fiber composed of the copolyester of claim 1 in which the acidic material is terephthalic acid, the glycol containing 2–12 carbon atoms is 1,4-cyclohexanedimethanol and the dimer glycol is present in an amount corresponding to 2–6 mole percent.

15. Synthetic fiber composed of the copolyester of claim 1 in which the acidic material is terephthalic acid, the glycol containing 2–12 carbon atoms is 2,2,4,4-tetramethylcyclobutane-1,3 diol and the dimer glycol is present in an amount corresponding to 2–6 mole percent.

16. A moldable plastic composition capable of producing tough, flexible products of high impact and tensile strength composed of the copolyester of claim 1 in which the acidic component is terephthalic acid, the glycol of 2–12 carbon atoms is ethylene glycol and the dimer glycol is present in an amount corresponding to 6–35 mole percent.

17. A moldable plastic composition capable of producing tough, flexible products of high impact and tensile strength composed of the copolyester of claim 1 in which the acidic component is terephthalic acid, the glycol of 2–12 carbon atoms is 1,4-cyclohexanedimethanol and the dimer glycol is present in an amount corresponding to 6–35 mole percent.

18. A moldable plastic composition capable of producing tough, flexible products of high impact and tensile strength composed of the copolyester of claim 1 in which the acidic component is terephthalic acid, the glycol of 2–12 carbon atoms is 2,2,4,4-tetramethylcyclobutane-1,3 diol and the dimer glycol is present in an amount corresponding to 6–35 mole percent.

References Cited in the file of this patent

UNITED STATES PATENTS

| | | |
|---|---|---|
| 2,347,562 | Johnston | Apr. 25, 1944 |
| 2,901,466 | Kibler et al. | Aug. 25, 1959 |